(12) United States Patent
Di Cecilia et al.

(10) Patent No.: US 12,548,186 B2
(45) Date of Patent: Feb. 10, 2026

(54) AUTONOMOUS DRIVING SYSTEM IN THE AGRICULTURAL FIELD BY MEANS OF AN INFRARED CAMERA

(71) Applicant: CNH Industrial America LLC, New Holland, PA (US)

(72) Inventors: Luca Di Cecilia, Modena (IT); Luca Ferrari, Modena (IT); Nicola Lenzini, Pievepelago (IT)

(73) Assignee: CNH Industrial America LLC, New Holland, PA (US)

( * ) Notice: Subject to any disclaimer, the term of this patent is extended or adjusted under 35 U.S.C. 154(b) by 539 days.

(21) Appl. No.: 17/912,307

(22) PCT Filed: Mar. 16, 2021

(86) PCT No.: PCT/EP2021/056590
§ 371 (c)(1),
(2) Date: Sep. 16, 2022

(87) PCT Pub. No.: WO2021/185790
PCT Pub. Date: Sep. 23, 2021

(65) Prior Publication Data
US 2023/0145541 A1 May 11, 2023

(30) Foreign Application Priority Data
Mar. 17, 2020 (IT) .................. 102020000005686

(51) Int. Cl.
*G06T 7/73* (2017.01)
*A01B 69/04* (2006.01)
*G05D 1/00* (2024.01)

(52) U.S. Cl.
CPC .............. *G06T 7/73* (2017.01); *A01B 69/008* (2013.01); *G05D 1/0088* (2013.01);
(Continued)

(58) Field of Classification Search
CPC ............ G06T 7/73; G06T 2207/10048; G06T 2207/30188; G06T 2207/30252;
(Continued)

(56) References Cited

U.S. PATENT DOCUMENTS

2007/0269114 A1 * 11/2007 Jochem ................ G06V 20/588
382/209
2015/0321694 A1    11/2015 Nelson, Jr. et al.
(Continued)

FOREIGN PATENT DOCUMENTS

| CN | 101750051 | 6/2010 |
|---|---|---|
| CN | 105987684 | 10/2016 |

(Continued)

OTHER PUBLICATIONS

International Application No. PCT/EP2021/056590, International Search Report and Written Opinion, mailed on May 25, 2021, 12 pgs.

*Primary Examiner* — Todd Melton
*Assistant Examiner* — Jason R Roberson
(74) *Attorney, Agent, or Firm* — Fletcher Yoder, P.C.

(57) ABSTRACT

Autonomous driving method in the agricultural field by means of an thermal camera comprising the procedure of obtaining an interpolating function of at least two pixels, of alignments of plants or swaths of a thermal image that appears in front of an agricultural vehicle, acquired through at least one thermal camera, said at least two pixels being corresponding to at least two homologous peaks identified in as many at least two vectors built on values of temperature intensity of corresponding consecutive pixels belonging to as many straight and horizontal lines of pixels extracted from the thermal image and a procedure for calculating an
(Continued)

angular phase shift and/or a lateral deviation of the interpolating function with respect to a vertical axis of the thermal image.

18 Claims, 5 Drawing Sheets

(52) U.S. Cl.
CPC ............... *G05D 1/0231* (2013.01); *G06T 2207/10048* (2013.01); *G06T 2207/30188* (2013.01); *G06T 2207/30252* (2013.01)

(58) Field of Classification Search
CPC ............ A01B 69/008; A01B 69/001; G05D 1/0088; G05D 1/0231
See application file for complete search history.

(56) References Cited

U.S. PATENT DOCUMENTS

| | | | | |
|---|---|---|---|---|
| 2017/0006759 | A1* | 1/2017 | Adamchuk | B62D 1/00 |
| 2023/0026679 | A1* | 1/2023 | Matarazzo, | B64C 39/024 |

FOREIGN PATENT DOCUMENTS

| | | |
|---|---|---|
| CN | 108571961 | 9/2018 |
| CN | 208863203 | 5/2019 |
| CN | 110243372 | 9/2019 |
| WO | 2018226437 | 12/2018 |

* cited by examiner

AUTONOMOUS DRIVING SYSTEM IN THE AGRICULTURAL FIELD BY MEANS OF AN INFRARED CAMERA

CROSS-REFERENCE TO RELATED APPLICATIONS

This application is a national stage of PCT Application No. PCT/EP2021/056590, entitled "Autonomous Driving System in the Agricultural Field by Means of an Infrared Camera", filed Mar. 16, 2021, which claims priority from and the benefit of IT Application No. 102020000005686, filed Mar. 17, 2020. Each of the foregoing applications is hereby incorporated by reference in its entirety.

FIELD OF THE INVENTION

The present invention relates to an autonomous driving system in the agricultural field by means of infrared cameras, in particular in the field of crops made in parallel rows, such as vineyards, berries, corn, coffee, orchards and olive trees and in the field of swaths for the production of hay or forage bales.

STATE OF THE ART

The implementation of infrared viewers in the agricultural sector is well known.

WO2018226437 describes an advanced driving assistance system based on the use of a far infrared camera without shutter (FIR) equipped with an optical unit with at least one lens. The FIR sensor is coupled to the optical unit and configured to acquire FIR images, while an integrated circuit is configured to process the FIR images captured to emit a thermal video stream without correcting the shutter opening. CN208863203 shows a smart garden robot, comprising a green plant cutting device in the front is used to trim green plants by adjusting a length, so as to cut the side face and the top of a low hedge. The cutting operation can be determined through a camera with automatic recognition technology and the cutting result can be detected in real time through the infrared detection device, and if a deviation occurs, an alarm is issued through the alarm and the operation is aborted.

These systems are not particularly suitable, especially when applied to a large agricultural vehicle.

If not specifically excluded in the detailed description below, what is described in this chapter is to be considered as an integral part of the detailed description.

SUMMARY OF THE INVENTION

The purpose of the present invention is to present an autonomous driving method based on thermal vision, by means of one or more infrared cameras (thermal cameras) with long wave, capable of allowing at least an automatic realignment of an autonomous driving vehicle along rows of plantations and swaths.

The basic idea of the present invention is to associate one or more infrared cameras to a vehicle in order to obtain at least one thermal image facing the vehicle, so that the measured temperature is represented in each pixel of the thermal image by means of a chromatic scale.

The image acquired by the thermal camera or extracted from a larger image, has an approximately rectangular shape, and it can be associated with a Cartesian reference system with axes parallel to the sides of the image. Preferably, the origin of the Cartesian reference system is at the bottom left of the image itself.

The method object of the present invention provides that at least two consecutive pixel lines, horizontal and therefore parallel to each other, are selected from the acquired thermal image.

The temperature associated with each pixel of the line is extrapolated from each line and a vector of temperature values corresponding, in terms of position, to the pixels of the same line is generated.

A Gaussian or other fitting is performed on each vector—polynomial, catenary, etc . . . identifying one or more maxima.

The same fitting operation is performed on the other vectors.

The so-called homologous maxima are identified, i.e. those maxima, within the two or more vectors that are in positions, within their own vector, similar to the position of the other maxima in their respective vectors.

This is equivalent to selecting a first maximum of a first vector, identifying a neighbourhood of the first maximum and identifying a first maximum of a second vector, within the same neighbourhood transposed on the second vector.

From a graphical point of view, when the vectors are represented in temperature graphs, this is equivalent to windowing the graphs with rectangular, vertical windows of width equal to the aforementioned neighbourhood.

The maximum homologues are strongly correlated and generally relative to the same alignment of plants, crops or swaths.

The method envisages joining the homologous maxima by means of an interpolating line, such as a polynomial fit of degree 1, which interpolates the homologous maximum points, i.e. those identified on the two or more horizontal lines of pixels.

Several interpolating lines can be obtained, in relation to the width of the thermal image. The most central linear fillet in the figure is selected.

An angular phase shift between the interpolation line and the ordinate axis associated with the temperature image, corresponds to an angular phase shift of the longitudinal development axis of the vehicle with respect to the alignment of the crop or swath field.

Thanks to the present method, it is possible to identify an angular phase shift of the vehicle and correct it.

Preferably, the vehicle is at least pre-aligned, albeit roughly, prior to the implementation of the present method. The pre-alignment, for example, can be performed manually or based on cartographic/GPS information.

In a preferred variant of the invention, if the vehicle is preliminarily pre-aligned with the alignments of a plantation or swath, then it can be envisaged to window the temperature image before performing the Gaussian fitting. Therefore, the selection of the central interpolating line is an optional step.

The window preferably consists in the extraction of a rectangle with sides parallel to the reference system of the temperature image, in a medial position of the image. This window can take into account any deviation between the vision axis of the thermal camera and the development axis of the vehicle.

If the thermal image extracted is the one that is centrally in front of the vehicle, then the window is substantially central to the temperature image. The windowing allows to limit the computational load.

When the thermal camera is aligned with the longitudinal development axis of the vehicle and the maximum interpolation line coincides with the vertical medial line in the temperature image, this means that the vehicle development axis is superimposed on an alignment of the crop or harvest, for example with a swath for baling.

When, on the other hand, the medial line of the image is parallel to the interpolation line, but distanced from it, this means that the vehicle moves in accordance with the alignment of the rows or swaths, but with a certain deviation (linear offset) between two rows or adjacent swaths.

Thanks to the present method, it is possible to identify a lateral deviation of the vehicle with respect to an alignment of a crop and correct it.

Furthermore, in some cases, it is desired that the vehicle moves between two rows of a plantation without damaging the plants, with the longitudinal development axis of the vehicle superimposed on the center line of the plant alignments.

In fact, once an approximate distance between the rows is known, the system can force the vehicle's development axis to remain aligned with at least one row and spaced from it by a predetermined distance, for example equal to half the approximate distance between two adjacent rows.

Therefore, the present invention also makes it possible to control a position of the vehicle between two alignments of adjacent plants or swaths.

The dependent claims describe preferred variants of the invention, forming an integral part of the present description.

BRIEF DESCRIPTION OF FIGURES

Further objects and advantages of the present invention will become clear from the following detailed description of an example of its embodiment (and its variants) and from the annexed drawings given purely for explanatory and non-limiting purposes, in which.

The same reference numbers and letters in the figures identify the same elements or components.

In the context of the present description, the term "second" component does not imply the presence of a "first" component. These terms are in fact used as labels to improve clarity and should not be understood in a limiting way.

The elements and features illustrated in the various preferred embodiments, including the drawings, can be combined with each other without however departing from the scope of this application as described below.

DETAILED DESCRIPTION OF IMPLEMENTATION EMBODIMENTS

Figure 1:
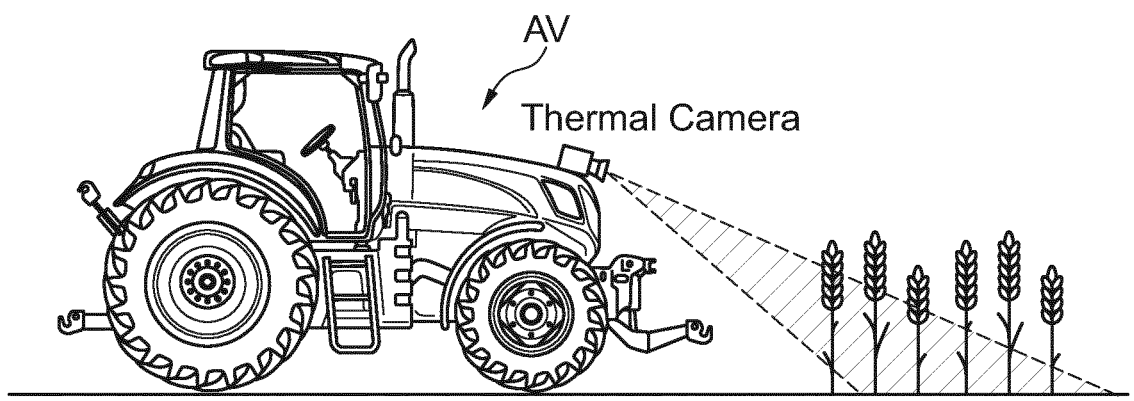
FIG. 1 shows a side view of an example of an agricultural vehicle equipped with a thermal imaging camera.

With reference to FIG. 1, where an AV agricultural vehicle is shown to which at least one thermal camera is associated. The thermal camera can be positioned so that a relative vision axis is parallel with a development axis of the vehicle.

According to a top view of the vehicle, the development axis of the vehicle and the viewing axis of the camera are at a fixed distance that can be zero. Since the camera's viewing axis is confused with the camera itself, then the expression "camera parallel to" means that "the camera's viewing axis is parallel to". Furthermore, when we say that the camera is "aligned with the development axis of the vehicle" it means that the aforementioned distance is zero.

It is worth highlighting that it is not an important aspect the alignment of one or more thermal imaging cameras with the vehicle's development axis as the fact that an approximately rectangular thermal image that appears in front of the vehicle is extracted. In fact, thermal imaging cameras can also be angled to widen the horizon of vision that lies ahead of the vehicle for further purposes.

For example, it is possible to provide a plurality of thermal imaging cameras arranged in a radial pattern to have a 360° thermal view around the vehicle.

Figure 2:
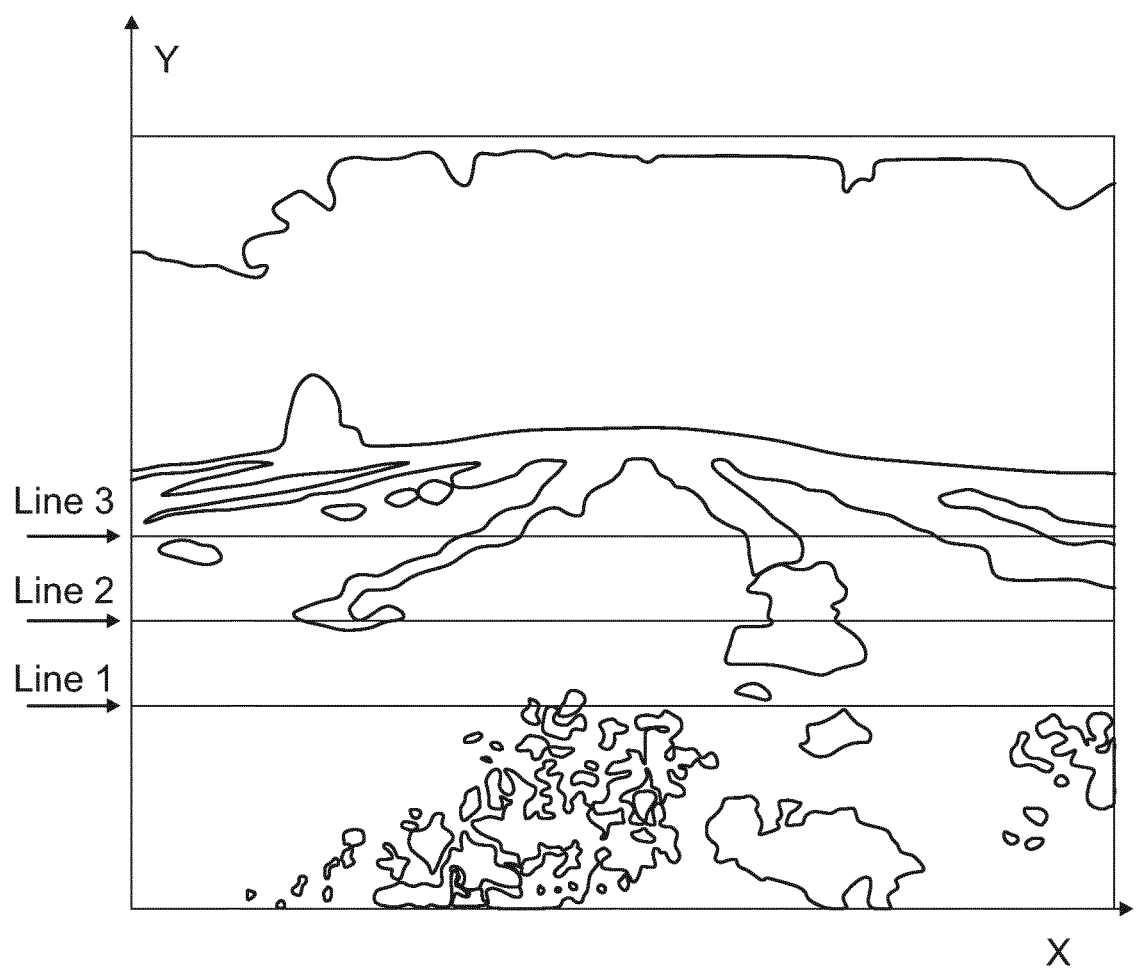
FIG. 2 shows a thermal image captured or extracted from the scenario, captured by the thermal camera which faces the vehicle of FIG. 1.

An example of an extracted image is shown in FIG. 2. Of the extracted image, each pixel represents an absolute or relative temperature of the corresponding object that is present in the scene.

Preferably, at least one thermal camera acquires a temperature image, which is calculated by means of a calibration carried out in advance and a definition of the emissivity coefficient of the objects in the scene which in this case are organic samples.

In other words, the autonomous driving system, in relation to the type of mission, can apply different calibrations to the thermal imaging camera.

According to the present invention, from the thermal image acquired or extracted from a larger image, at least two lines of pixels parallel to each other and horizontal are selected, that is, parallel with the abscissa axis X associated with the thermal image.

In FIG. 2, three lines of pixels are extracted: Line 1, Line 2, Line 3.

Increasing the number of extracted lines increases the accuracy of the vehicle alignment with the alignment of plants or swaths.

From each line, the temperature intensity associated with each pixel of the same line is extrapolated and a vector V1, V2, etc . . . of temperature values corresponding to the pixels of the same line is generated.

A Gaussian or other fitting is performed on each vector—polynomial, catenary, etc . . . identifying one or more maxima: M1, M2, M3.

For convenience, the notation V1:M1 is used to indicate that the first maximum M1 belongs to the first vector V1, etc . . . . Obviously, if the thermal camera is placed very high with respect to the plant alignments, the thermal image also contains information about the lateral alignments. Therefore, it is likely that in each vector as many maxima are identified as the alignments visible in the thermal image.

The same fitting operation is performed on the other vectors, V2, V3, etc . . . .

The so-called homologous maxima V1:M1-V2:M1, V1:M2-V2:M2 etc are identified, i.e. those maxima, within the two or more vectors that are in positions, within their own vector, similar to the position of the other maxima in their respective vectors.

This is equivalent to selecting a first maximum of a first vector, identifying a neighborhood I1 of the first maximum of the first vector V1 and identifying a first maximum M1 of the second vector V2, within the same neighborhood I1 transposed on the second vector.

If it is not possible to identify the maximum homologue, it proceeds to widen the neighborhood of the first maximum and therefore its transposition on the second vector.

For calculation economy, it is advisable to discard the lateral maxima by windowing the original thermal image.

In other words, preferably, before extracting the pixel lines, constructing the temperature vectors, identifying the maximums, it proceeds to apply an approximately central W window, with respect to the vehicle development axis.

Figure 4:
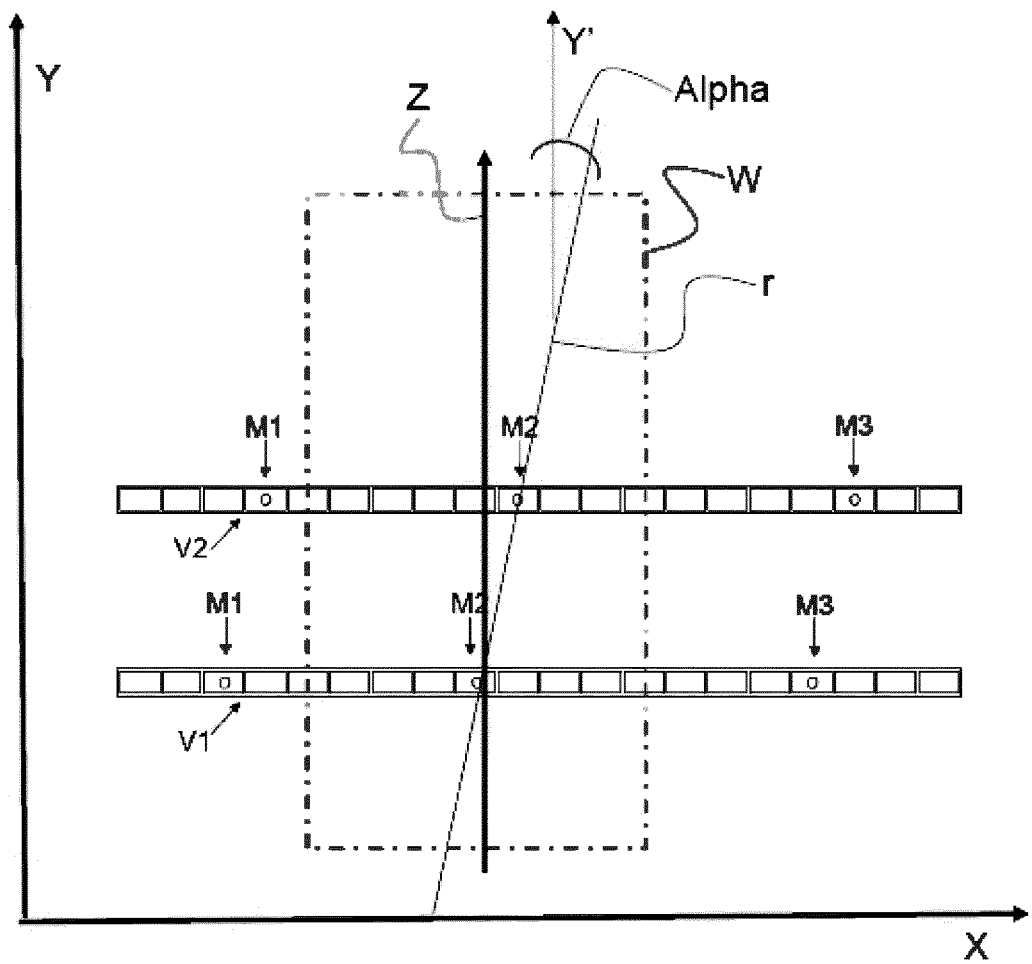
FIG. 4 shows the interpolation of maximum homologues relating to the two vectors in FIG. 3, identifying an angular phase shift between the vehicle's development axis and an alignment of plants or swaths.
Figure 5:
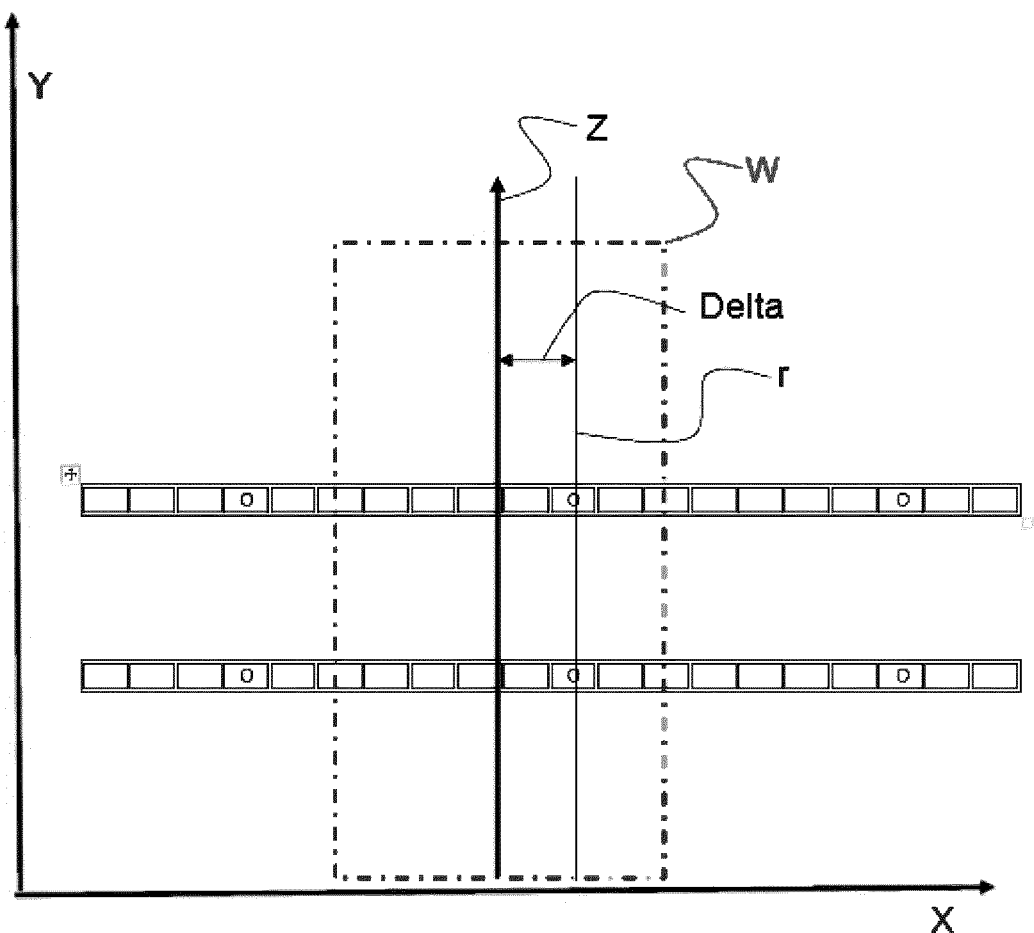
FIG. 5 shows the interpolation of maximum homologues relating to the two vectors in FIG. 3, identifying a linear displacement between the development axis of the vehicle and an alignment of plants or swaths.

FIGS. 4 and 5 show the window W and the vehicle development axis which may not coincide with the medial vertical axis of the thermal image. In any case, this is a transposition within the tasks of the person skilled in the art.

Once the homologous maxima have been identified, it proceeds to calculate an interpolation line r which connects the homologous maxima, preferably only the central ones, i.e. those falling in the window W.

At least during the phase of calculating the interpolation line, the homologous maxima are placed in the position of the corresponding pixels. In other words, the interpolation is performed between the pixels of the thermal image corresponding to the maximum homologues.

When the extracted lines are two, then it is possible to speak of an interpolating line, otherwise it is more correct to speak of an interpolating function because it is unlikely that the three or more homologous maxima will be perfectly aligned.

Figure 3:
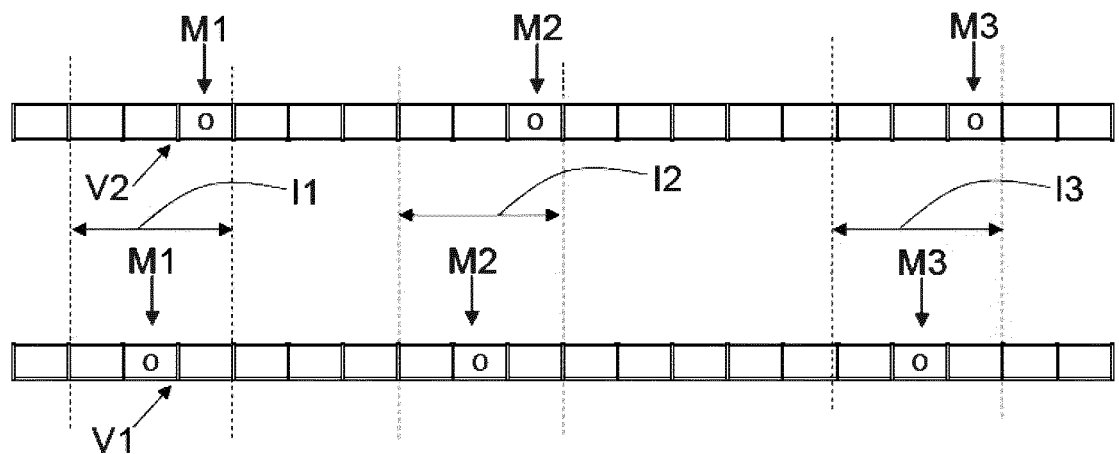
FIG. 3 shows two temperature vectors of as many corresponding lines of pixels extracted from the image of FIG. 2.

The central axis Z of the window is an axis perpendicular to the development axis of the vehicle and parallel to the Y axis associated with the thermal figure and the interpolation scheme of the maxima of vectors V1, V2, etc . . . of FIGS. 3-5.

FIG. 4 shows a condition in which the interpolating line r is angularly out of phase with the ordinate axis Y. In this case, the angle Alpha formed represents the angle that the autonomous driving system must recover to arrange the agricultural vehicle aligned with the alignment detected by thermal imaging camera.

FIG. 5 shows a condition in which the interpolating line r is laterally offset by a lateral offset Delta from the central axis Z. In this case, the autonomous driving system can ensure that the vehicle's axis Z remains at the predetermined distance Delta from an alignment or it can cause the vehicle to move so that the straight line r is superimposed on the central axis Z (Delta=0).

Obviously, the present invention can be limited to monitoring a misalignment of the vehicle with respect to an alignment of a plantation or swath, or, on the basis of the monitoring system, it can control the steering and advancement system of the vehicle to control its moving forward.

Figure 6:
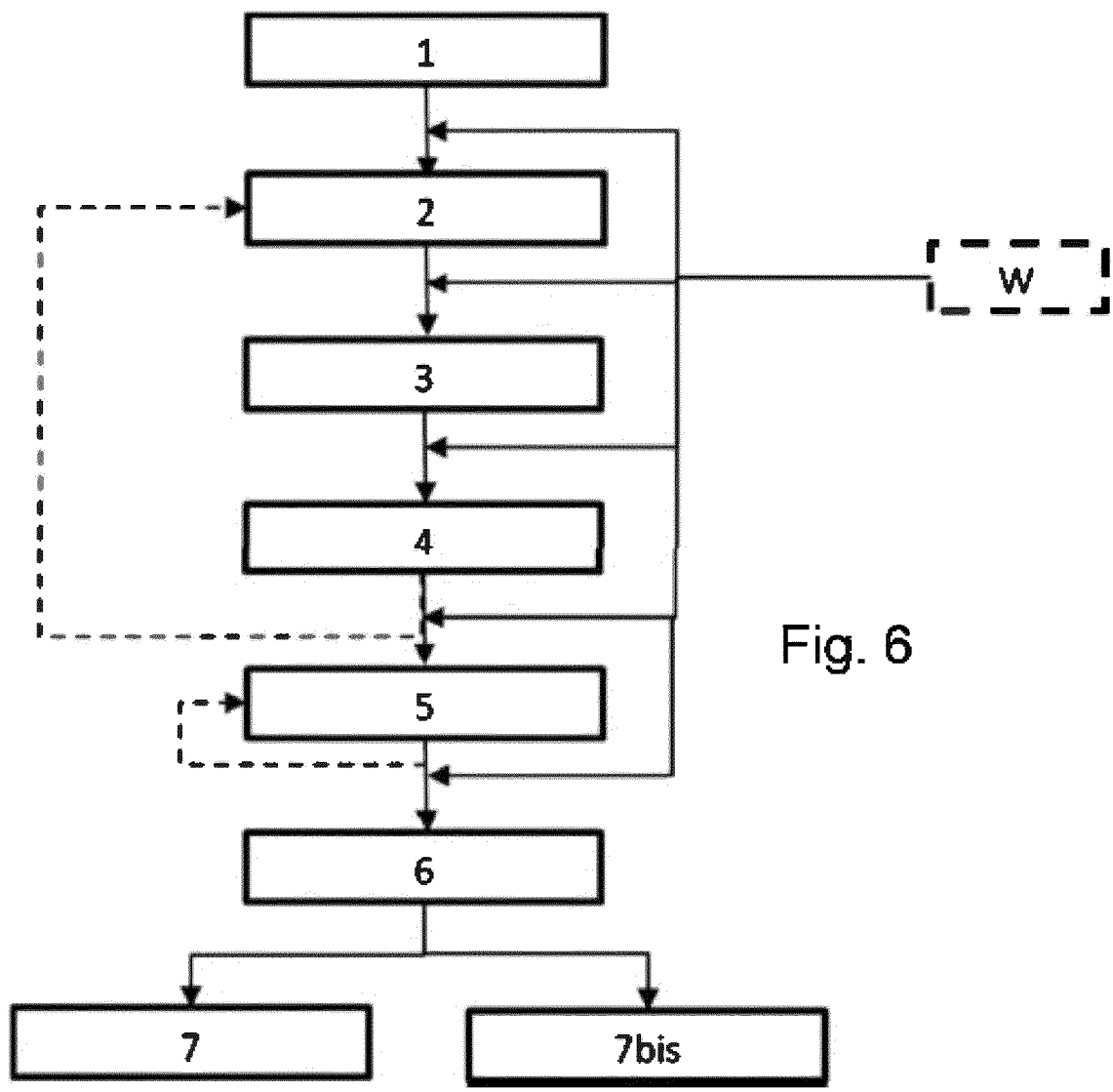
FIG. 6 shows a flow diagram of an example of the method object of the present invention.

FIG. 6 describes an exemplary flow chart of the method object of the present invention. The method includes the following steps:

Step 1: capture or extract a thermal image,
Step 2: extraction of at least two lines of pixels Line 1, Line 2, etc . . . , i.e. straight horizontal lines,
Step 3: construction of as many vectors, in which in each position of one of the vectors there is a temperature intensity value of a corresponding pixel of the corresponding line,
Step 4: Gaussian or polynomial interpolation, etc. To obtain maxima M1, M2, M3, positive or negative on each of the vectors,
Step 5: identification of homologous maxima by transposition, on a second vector V2, of a neighborhood I1, I2, I3 centered on the maximum M1:V1, M2:V1, M3:V1 of a first vector, and possibly repetition of this step to all other vectors with respect to the first two,
Step 6: interpolation by interpolating line r of homologous maxima, in particular of only the maxima contained in a central window W of the thermal image,
Step 7: determination of an Alpha angle of phase shift of the agricultural vehicle with an alignment of plants or swaths, in which said angle is given by the intersection between the medial Z axis of the thermal image or the Y, Y' ordinate axis and the interpolating line r, e/o
Step 7bis: determination of a lateral Delta offset of the agricultural vehicle with an alignment of plants or swaths, given by a distance between said interpolating straight line r and said medial axis Z of the thermal image.

Obviously, while the shifting angle is in itself metric, the lateral shift or offset can be calculated by reporting the distance in pixels in metric distance. This is easily achieved by knowing the characteristics of the camera's optics.

FIG. 6 indicates a dashed arrow, which takes into account the fact that more than two temperature intensity vectors can be constructed.

Since it is constructively imposed that the medial axis Z is parallel to the ordinate axis Y—and to any axis parallel Y' to the ordinate axis Y—then the angular phase shift can be identified between the interpolating line r and any of Z, Y, Y'.

Figure 7:
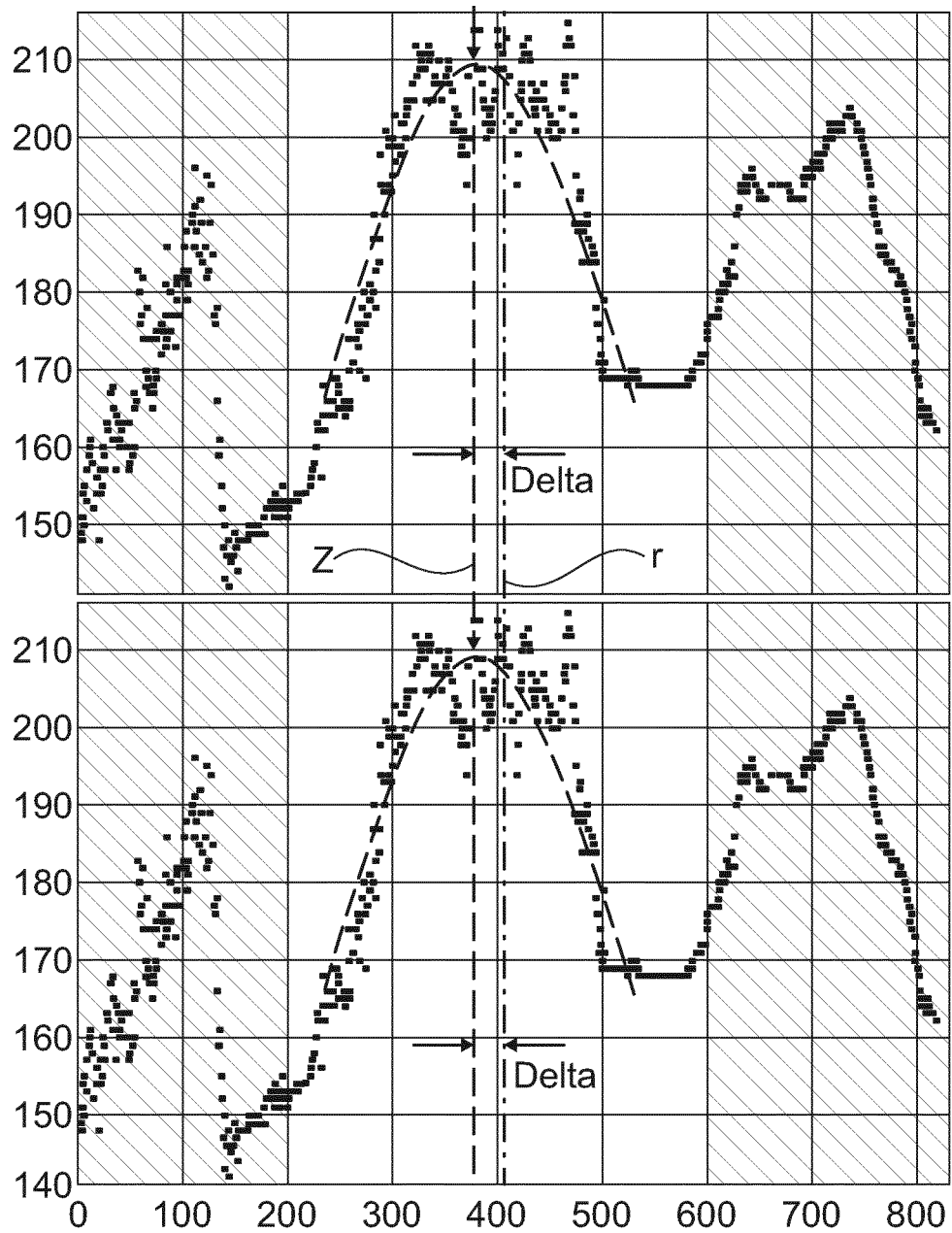
FIG. 7 shows the fitting procedure operated on curves constructed on the temperature intensities of the vectors of FIG. 3 and the interpolation of the respective central maxima.

FIG. 7 graphically shows the fitting operations performed on line 1 and line 2. The maxima are interpolated and the identified line r is parallel with the medial axis Z, defining a lateral deviation Delta, which must be cancelled or maintained or increased, depending on the mission that the agricultural vehicle is facing.

The windowing operation W is indicated in a dotted block that is optional and can be performed at any point in the method.

It is worth noting that the transposition of the neighborhoods I1, I2, I3 may not be performed when the windowing is performed in the early stages of the method or when the thermal image is originally very narrow, in terms of the field of view.

According to a preferred variant of the invention, also the lateral maxima M1, M3 on the vectors V1, V2, etc . . . are taken into consideration when it may happen that the reference alignment is interrupted for any reason. In this case, any angular errors due to optical aberrations are compensated by considering at the same time a right interpolating line and a left interpolating line. These compensation operations are within the tasks of the skilled person in the art who knows the laws of optics.

Regarding the selection of pixel lines, a preferred method is indicated below.

Meanwhile, it is worth pointing out that the consistency between the calculated interpolating function and the alignment of the plants or swaths is better as the more uniform is the distribution of pixel lines Line 1, Line 2, etc . . . in the thermal image.

Preferably, everything above the horizon is masked, i.e. eliminated, from the thermal image.

The remaining portion of the image is divided into horizontal bands, and a line of pixels is extracted within each band.

When the fitting operation is performed, it is possible to discard a pixel line in favor of another pixel line belonging to the same band, when a correlation coefficient (Pearson), relative to the fitting procedure, is below a predetermined threshold. Therefore, the lines can be selected in order to have an optimal Gaussian fitting.

This means that steps 2 to 4 can be looped through to an optimal situation.

Considering today's computing capabilities, this can be done while the vehicle is moving forward, without any particular risk.

The present invention can be advantageously realized by means of a computer program, which comprises coding means for carrying out one or more steps of the method, when this program is executed on a computer. Therefore, it is intended that the scope of protection extends to said computer program and further to computer readable means comprising a recorded message, said computer readable means comprising program coding means for carrying out one or more steps of the method, when said program is run on a computer.

Implementation variants of the described non-limiting example are possible, without however departing from the scope of protection of the present invention, including all the equivalent embodiments for a person skilled in the art, to the content of the claims.

From the above description, the person skilled in the art is able to realize the object of the invention without introducing further construction details.

The invention claimed is:

1. A method for autonomous driving in the agricultural field, comprising:
    obtaining, via a processing unit, an interpolating function of at least two pixels of an alignment of plants or swaths of a thermal image that appears in front of an agricultural vehicle acquired through at least one thermal camera, wherein the at least two pixels correspond to at least two homologous peaks identified in at least two corresponding vectors built on values of temperature intensity of corresponding consecutive pixels belonging to straight and horizontal lines of pixels extracted from the thermal image;
    determining, via the processing unit, an angular phase shift, a lateral deviation, or a combination thereof, of the interpolating function with respect to a vertical axis of the thermal image; and
    controlling, via the processing unit, a steering system, a propulsion system, or a combination thereof, based on the angular phase shift, the lateral deviation, or the combination thereof, so as to obtain an advancement of the agricultural vehicle parallel or superimposed with the alignment of the plants or the swaths.

2. The method according to claim 1, wherein the thermal image is extracted so a relative medial axis is vertical and perpendicular to a longitudinal development axis of the agricultural vehicle.

3. The method according to claim 1, wherein at least one positive or negative peak in each of the at least two corresponding vectors is identified by means of a Gaussian or polynomial fitting procedure.

4. The method according to claim 1, wherein the thermal image has a rectangular shape, a horizontal orientation is identified coincidently at a base of the thermal image, and a vertical orientation is perpendicular to the base.

5. The method according to claim 4, wherein the vertical orientation is coincident with one vertical side of the thermal image.

6. The method according to claim 1, wherein a positive peak in a second vector of the at least two corresponding vectors is homologous to a positive peak in a first vector of the at least two corresponding vectors when the positive peak in the second vector is contained in a range of elements including the positive peak in the first vector transposed into the second vector.

7. The method according to claim 6, wherein a size of the range of elements including the positive peak in the first vector is iteratively enlarged until the positive peak in the second vector is identified.

8. The method according to claim 1, comprising searching for the at least two homologous peaks after applying a window which is approximately rectangular and central to the thermal image.

9. The method according to claim 1, comprising the following steps in succession:
    acquisition or extraction of the thermal image;
    extraction of the at least two lines of pixels;
    construction of the at least two corresponding vectors;
    Gaussian or polynomial fitting to get at least one positive or negative peak in each of the at least two corresponding vectors;
    identification of the at least two homologous peaks by transposition on a second vector of the at least two corresponding vectors of a neighborhood centered on a peak of the at least one positive or negative peak in a first vector of the at least two vectors; and
    interpolation through the interpolating function;
    wherein the vertical line is a medial axis of the thermal image or an axis of the ordinates when determining the angular phase shift, and the vertical line is the medial axis of the thermal image when determining the lateral deviation.

10. The method according to claim 1, comprising a procedure for selecting the straight and horizontal lines of pixels extracted from the thermal image, comprising:
    preliminary subdivision of the thermal image into two or more horizontal bands;
    extraction of at least two straight first horizontal lines of pixels belonging to different bands of the two or more horizontal bands;
    Gaussian or polynomial fitting to get at least one positive or negative peak in each of the at least two corresponding vectors and determining a relative fitting coefficient on each vector of the at least two corresponding vectors corresponding to each line of the at least two straight first horizontal lines, if the relative fitting coefficient is lower than a threshold then:
    selection of a straight second horizontal line of pixels belonging to the same horizontal band and different from a corresponding straight first horizontal line of the at least two straight first horizontal lines.

11. Computer readable medium comprising program coding arranged to perform the method of claim 1 when the program coding is run on a computer.

12. The method according to claim 1, wherein a negative peak in a second vector of the at least two corresponding vectors is homologous to a negative peak in a first vector of the at least two corresponding vectors when the negative peak in the second vector is contained in a neighborhood of the negative peak in the first vector transposed into the second vector.

13. The method according to claim 12, wherein an amplitude of the neighborhood of the negative peak in the first vector is iteratively enlarged until the negative peak in the second vector is identified.

14. An autonomous driving system integrated into an agricultural vehicle equipped with a propulsion system, a steering system, and at least one thermal camera, in which the autonomous driving system includes a processing unit configured to:
   obtain an interpolating function of at least two pixels of an alignment of plants or swaths of a thermal image that appears in front of the agricultural vehicle acquired through the at least one thermal camera, wherein the at least two pixels correspond to at least two homologous peaks identified in at least two corresponding vectors built on values of temperature intensity of corresponding consecutive pixels belonging to straight and horizontal lines of pixels extracted from the thermal image;
   determine an angular phase shift, a lateral deviation, or a combination thereof, of the interpolating function with respect to a vertical axis of the thermal image; and
   control the steering system, the propulsion system, or a combination thereof, based on the angular phase shift, the lateral deviation, or the combination thereof, so as to obtain an advancement of the agricultural vehicle parallel or superimposed with the alignment of the plants or the swaths.

15. The autonomous driving system of claim 14, wherein the thermal image has a rectangular shape, a horizontal orientation is identified coincidently at a base of the thermal image, and a vertical orientation is perpendicular to the base.

16. The autonomous driving system of claim 15, wherein the vertical orientation is coincident with one vertical side of the thermal image.

17. The autonomous driving system of claim 14, wherein the processing unit is configured to search for the at least two homologous peaks after applying a window which is approximately rectangular and central to the thermal image.

18. The autonomous driving system of claim 17, wherein the processing unit is configured to iteratively enlarge a size of the range of elements including the positive peak in the first vector until the positive peak in the second vector is identified.

* * * * *